United States Patent
Ecker et al.

(10) Patent No.: US 10,124,703 B2
(45) Date of Patent: Nov. 13, 2018

(54) VEHICLE SEAT AND METHOD FOR STOWING A SEAT ELEMENT

(71) Applicant: Johnson Controls Components GmbH & Co. KG, Kaiserslautern (DE)

(72) Inventors: Roman Ecker, Trippstadt (DE); Joachim Mühlberger, Obersülzen (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 190 days.

(21) Appl. No.: 15/034,094

(22) PCT Filed: Nov. 5, 2014

(86) PCT No.: PCT/EP2014/073848
§ 371 (c)(1),
(2) Date: May 3, 2016

(87) PCT Pub. No.: WO2015/067673
PCT Pub. Date: May 14, 2015

(65) Prior Publication Data
US 2016/0272090 A1    Sep. 22, 2016

(30) Foreign Application Priority Data

Nov. 5, 2013 (DE) .......... 10 2013 222 410
Jan. 20, 2014 (DE) .......... 10 2014 000 504

(51) Int. Cl.
*B60N 2/30* (2006.01)

(52) U.S. Cl.
CPC ........... *B60N 2/3009* (2013.01); *B60N 2/309* (2013.01); *B60N 2/3011* (2013.01);
(Continued)

(58) Field of Classification Search
CPC .. B60N 2/3009; B60N 2/3011; B60N 2/3031; B60N 2/3061; B60N 2/3065; B60N 2/309
(Continued)

(56) References Cited

U.S. PATENT DOCUMENTS

| 8,474,910 | B2 | 7/2013 | Kämmerer |
| 2008/0252129 | A1 | 10/2008 | Nathan et al. |
| 2011/0037304 | A1* | 2/2011 | Kämmerer ............... B60N 2/12 297/340 X |

FOREIGN PATENT DOCUMENTS

| CN | 101992702 A | 3/2011 |
| DE | 19514380 C2 | 11/1995 |

(Continued)

OTHER PUBLICATIONS

International Search Report and Written Opinion for Application No. PCT/EP2014/073848 dated Jan. 28, 2015.
(Continued)

*Primary Examiner* — Anthony D Barfield
(74) *Attorney, Agent, or Firm* — The Dobrusin Law Firm, P.C.

(57) ABSTRACT

The invention relates to a vehicle seat (1) comprising a seat element (2) that can be vertically adjusted from an operational position to a stowed position. Said vehicle seat has •—a first locking element for securing the seat element in the operational position, and •—a positioning means for positioning the seat element in a transitional position, the seat element being manually transferable directly or indirectly from the transitional position to the stowed position.

8 Claims, 3 Drawing Sheets

(52) U.S. Cl.
CPC ......... *B60N 2/3031* (2013.01); *B60N 2/3061* (2013.01); *B60N 2/3065* (2013.01)

(58) Field of Classification Search
USPC ........................................................ 297/340
See application file for complete search history.

(56) References Cited

FOREIGN PATENT DOCUMENTS

| | | |
|---|---|---|
| DE | 19918785 C1 | 2/2000 |
| DE | 69919359 T2 | 9/2005 |
| DE | 102004014605 B3 | 10/2005 |
| DE | 102004059027 A1 | 6/2006 |
| DE | 102007029495 B4 | 1/2009 |
| DE | 102009037816 B3 | 10/2010 |
| JP | 2009-142188 A | 7/2009 |

OTHER PUBLICATIONS

International Preliminary Report on Patentability for Application No. PCT/EP2014/073848, dated May 10, 2016.
Chinese examination report for Chinese Patent Application No. 201480070839.0, dated Apr. 21, 2017.

\* cited by examiner

VEHICLE SEAT AND METHOD FOR
STOWING A SEAT ELEMENT

PRIOR ART

The invention relates to a vehicle seat having a vertically adjustable seat element, and to a method for stowing a vehicle seat having a vertically adjustable seat element.

Vehicle seats having a vertically adjustable seat element are known and are arranged, for example, in motor vehicles. In order to increase a storage apace in the motor vehicle, the vehicle seats are intended to be able to take up a stowage configuration. It is particularly desirable for the vehicle seat stowed in the stowage configuration to adjoin the storage space in as flush as a manner as possible and therefore a common storage surface is implemented. In order to realize such a stowage configuration, it is provided in the prior art that a vertically adjustable seat element is pressed downward and a backrest element coupled to the seat element is pivoted onto the seat element. For this purpose, a multiplicity of maneuvers are generally required. Furthermore, backrest element and seat element are typically connected to each other via an activation coupling. The latter disadvantageously leads to slips in the backrest pad and to it not being possible to arrange a rectilinear gear rod between two fittings.

DISCLOSURE OF THE INVENTION

It is an object of the present invention to provide a vehicle seat which is transferable into a stowage configuration in as simple a manner as possible, i.e. with a minimum of maneuvers required. Furthermore, it would be desirable for it to be possible to dispense with an activation coupling in such a vehicle seat. Otherwise, such an activation coupling would result in slits in an upholstery of the vehicle seat or would prevent a rectilinear gear rod from being able to be arranged between two fittings.

The object is achieved by a vehicle seat having a seat element which is vertically adjustable from a use position into a storage position, wherein the vehicle seat has a first locking element for securing the seat element in the use position, and a positioning for positioning the seat element in a transition position, and wherein the seat element is transferable manually directly or indirectly from the transition position into the storage position.

It is of advantage in this case that, after the unlocking by the first locking element, the seat element is positionable into a position or transition position from which the seat element is manually transferable in a simple manner into the storage position. It is in particular conceivable here for the positioning element to keep the seat element in a position. It may be of advantage, for example, to keep the seat element in a transition position in order to avoid a gravity-induced displacement of the seat component into an undesired position. As a result, it is then advantageously possible to dispense with a correcting maneuver. The use position preferably corresponds in its orientation or position to the transition position of the seat element, wherein, in contrast to the transition position, a vertical adjustment of the seat element is prevented in the use position. In other words: the seat element is not usable by a potential passenger in the transition position.

Advantageous refinements and developments of the invention can be gathered from the dependent claims and from the description with reference to the drawings.

In a further embodiment, it is provided that the vehicle seat has a backrest element, wherein the backrest element is pivotable about a primary axis relative to the seat element. By pivoting the backrest element, a stowage position is taken up in an advantageous manner by the backrest element. It is conceivable here for the backrest element to be transferable into the stowage position before, during and/or after the transfer of the seat element into the storage position. If the backrest element is in the stowage position and the seat element is in the storage position, the vehicle seat takes up a stowage configuration. An activation coupling is preferably dispensed with here in an advantageous manner.

In a further embodiment, it is provided that the first locking element is unlockable by pivoting the backrest element and/or actuating an actuating means. If, during the pivoting of the backrest element, the first locking element is released, an additional unlocking mechanism which would additionally be required for pivoting the backrest element is dispensed with in an advantageous manner.

In a further embodiment, it is provided that the positioning means comprises a spring element. In particulars it is provided that, for the manual transfer of the seat element into the storage position, a force is intended to act on the seat element in a storage direction, wherein the force is directed counter to a restoring force of the spring and overcomes, i.e. over compensates, the restoring force of the spring. The spring is preferably individually adaptable to the requirements of the user. Furthermore, the spring element is arranged at an open and therefore easily accessible location in order to be able to exchange the spring element in an uncomplicated manner.

It is preferably provided hers that a restoring force of the spring element, preferably the mechanical spring element, keeps, i.e. positions, the seat element in the transition position. In particular, in the transition position, the seat element is arranged in a substantially vertically offset manner with respect to the storage position, wherein the transition position is arranged above the storage position. Pressing down the seat element, during which the action is directed counter to the restoring force of the spring element, then transfers the seat element, for example, from the transition position into the storage position. That is to say, by means of an, in particular manual, action of force opposed to the restoring force of the spring element, the seat element is transferable into the storage position. In particular, the restoring force runs substantially vertically or substantially perpendicularly to the main plane of extent of the seat element. Furthermore, it is provided that the spring element is arranged on the vehicle seat in such a manner that the restoring force acts on a front part of the seat element. In particular, the seat element is arranged in the transition position by means of the restoring force of the spring element in such a manner, in particular is kept inclined in such a manner, that the backrest element carries along the seat element as it pivots forward. Furthermore, it is conceivable for the spring element to be arranged directly on the seat element, in particular on one side of the seat element or of the seat element frame, or to be operatively connected via an articulation element to the seat element, in particular to one side of the seat element or of the seat element frame. Furthermore, it is conceivable for the seat element in the transition position to be arranged above the seat element in the storage position and/or in the use position. In addition, it is conceivable for the seat element in the storage position to be arranged below the position in the use position. For example, in the transition position, the seat element takes up the highest of all of the possible positions. Furthermore, it is conceivable for the spring element to be at least indirectly pretensioned by the first locking element and for the release of the first locking element to result in the restoring force transferring the seat element from the use position into the transition position.

In a further embodiment, it is provided that the backrest element is transferable into a stowage position by pivoting, wherein, in the stowage position, the backrest element is arranged in a substantially form-fitting manner along a storage direction for the seat element, the storage direction running substantially perpendicularly to a main plane of extent of the seat element. In particular, it is provided that, in the stowage position, the backrest element is at least partially a flow of force means which transmits the force necessary for transferring the seat element to the seat element and thereby brings about the transfer of the seat element from the transition position into the storage position. As a result, it is possible in an advantageous manner, by pivoting the backrest element and simultaneously or subsequently pressing down the backrest element, to transfer the seat element into the storage position and to transfer the backrest element into the stowage position, i.e. the vehicle seat into the stowage configuration, in a flowing sequence of movement.

In a further embodiment, it is provided that the vehicle seat has a second locking element for securing the seat element in the storage position, and/or the vehicle seat has a third locking element for securing the transition position. By means of the second locking element, the seat element can be fixed or secured in the storage position in an advantageous manner. In particular, the second locking element clips to the seat element when the seat element reaches or has taken up the stowage position. By means of the third locking element, preferably arranged at a lower position of the vehicle seat, two-handed operation can be realized which in an advantageous manner reduces a probability of an unintentional transfer of the vehicle seat into the stowage configuration.

In a further embodiment, it is provided that the vehicle seat has an articulation system, preferably a four-bar linkage, consisting of a first link and a second link, for folding up the seat element, and/or a further articulation system, preferably a further four-bar linkage, consisting of a third link and a fourth link for transferring the seat element from the transition position into the storage position. By means of the articulation system, the vehicle seat can be transferred into an alternative stowage configuration, provided that the vehicle seat is at least partially releasably attached directly or indirectly to the vehicle body.

It is preferably provided here that the spring element is integrated in the articulation system. The spring element is preferably a spiral spring which, for example, is operatively connected to the third link in such a manner that the restoring force of the spring element is transmitted via the third link to the seat surface and, as a result, the seat element is transferred into the transition position.

The invention, furthermore relates to a method for stowing a vehicle seat, wherein, in a first method step, a first locking element far securing a seat element of the vehicle seat in a use position is released, wherein, in a second method step, the seat element is kept in a transition position, and wherein, in a third method step, the seat element is transferred from the transition position into the storage position.

In a further embodiment, it is provided that a backrest element which is pivotable about a primary axis relative to the seat element is transferred in the first method step into a stowage position and is used as a flow of force means for transferring the seat element into the storage position, or is transferred after the third method step into a stowage position.

Further details, features and advantages of the invention emerge from the drawings and from the description below of preferred embodiments with reference to the drawings. The drawings illustrate merely exemplary embodiments of the invention which do not restrict the essential inventive concept.

EMBODIMENTS OF THE INVENTION

In the various figures, identical, parts are always provided with the same reference signs and are therefore generally also only named or mentioned once in each case.

Figure 1:
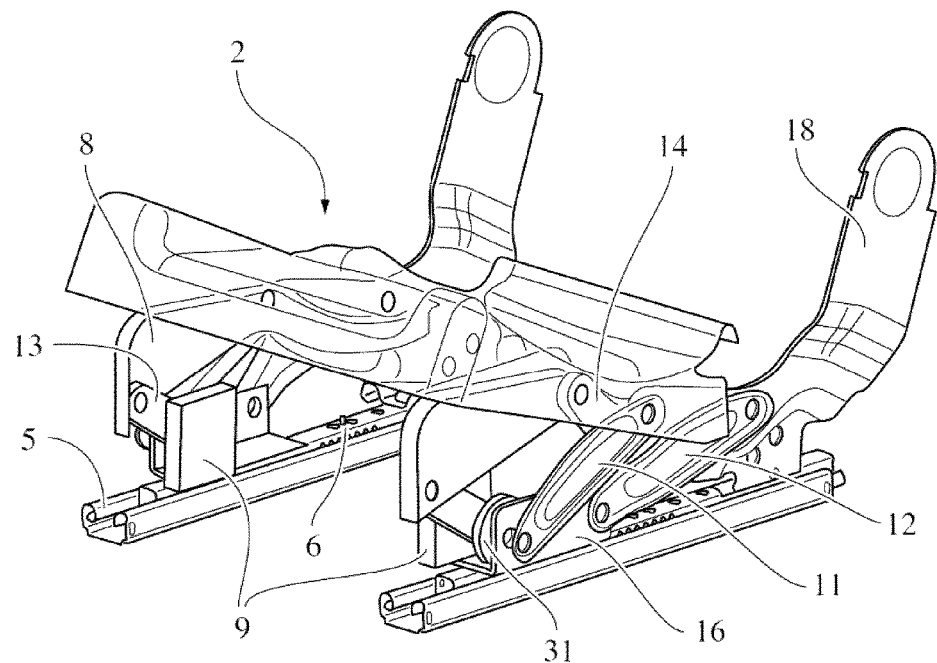
FIG. 1 schematically shows a lower basic body of a vehicle seat according to a first exemplary embodiment of the present invention.

FIG. 1 illustrates a lower basic body of a vehicle seat 1 according to a first exemplary embodiment of the present invention. The lower basic body preferably together with an upper basic body (not illustrated in FIG. 1) forms a vehicle seat 1. While the upper basic body comprises, for example, a backrest element 3 and a head restraint, the lower basic body preferably has a seat element 2 and a rail system. It is conceivable here for the seat element 2 to have a seat element frame and a seat cushion or pad attached to the seat element frame. The rail system preferably comprises an upper and a lower rail element 5 and 6, wherein the upper rail 6 is displaceable along a longitudinal direction of the vehicle relative to the lower rail 5 and is retainable in a retaining position. Furthermore, it is provided that the lower rail 5 is connected rigidly or fixedly to a vehicle body, in particular to a vehicle body floor. As a result, the vehicle seat 1 can be transferred along the longitudinal direction of the vehicle into a desired position. It is furthermore provided that the seat element 2 is vertically adjustable in order to be able to lower the seat element 2 when the latter takes up a storage position. As a result, a stowage configuration of the entire vehicle seat in a manner so as to save as much construction apace as possible can thereby be implemented in an advantageous manner. In particular, it is conceivable that, by lowering the seat element 2, as large and flat a storage surface as possible is formed together with the loading space already present. Furthermore, it is provided that the lower basic body has a front base part IS and a rear base part 18, wherein the front base part 15 is connected to the upper rail 6 of the rail system, and the rear base part is arranged releasably on the upper rail 6. In particular, the rear base part 18 comprises a closure means 19 which determines whether the rear base part 18 is or is not releasable from the upper rail 6. It is preferably provided that the backrest element 3 is coupled to the rear base part 18 in such a manner that the backrest element 3 is pivotable about a primary axis H relative to the seat element 2. Furthermore, the front and the rear base part 16 and 18 are connected to each other via an articulation system, preferably a four-bar linkage. As a result, the rear base part 18 can be pivoted relative to the front base part 16. Furthermore, the pivoted rear base part 18 can be aligned or oriented within the scope of the limits predetermined by the articulation system. In this case, for example, a four-bar linkage has a first link 11 and a second link 12, wherein the first link 11 is coupled to the front base part 16 so as to be pivot able about a first axis A and is coupled to the rear base part 18 so as to pivotable about a second axis B, and the second link 12 is coupled co the front base part so as to be pivotable about a third axis C and is coupled to the rear base part 18 about a fourth axis D. For the vertical adjustment, a further articulation system, preferably a further four-bar linkage, is provided, wherein the further articulation system, the front base part 16 and the rear base part 18 are connected to a seat element carrier 8 via the further articulation system. The seat element carrier is preferably part of the seat element 2 and/or is rigidly connected to the seat element 2. A further four-bar linkage here has, for example, a third link 13 and a fourth link 14, wherein the third link 13 is coupled to the front base part 16 so as to be pivotable about the first axis A and is coupled to the seat element carrier 5 so as to be pivotable about a fifth axis E, and the fourth link 12 is coupled to the seat element carrier 8 so as to be pivotable about a sixth axis F and is coupled to the rear base part 18 about a seventh axis G. In particular, the further articulation system is configured in such a manner that the seat element carrier 8, and therefore the seat element 2, is vertically adjustable along a storage direction I. It is conceivable here for the seat element carrier 8 to be pivoted by the further articulation system during the vertical adjustment in such a manner that the seat element carrier 8 substantially maintains its orientation. By pivoting the seat element carrier 8, it is possible for the seat element carrier 8, and therefore for the seat element 2, to undergo both a vertical offset and also an offset in the longitudinal direction of the vehicle. Furthermore, it is provided that a positioning means, preferably a spring element 31, is provided on the front base part 16. In particular, it is provided that the spring element 31 is arranged on the front base part 16 in operative connection with the third link 13 in such a manner that the restoring force of the spring element 31 keeps the seat element 3 in a transition position, for example via the seat element carrier 8. The transition position differs from the use position in that, in the use positions a first locking element ensures that the seat element 2 is not vertically adjustable. In order to transfer the seat element 2 from the transition position into the storage position, in addition to the unlocking of the first locking element a force is required which runs substantially parallel to the storage direction and over compensates the restoring force of the spring element 31 or overcomes the counteracting restoring force of the spring element 31. Such a force could originate from a potential user of the vehicle seat 1, as a result of which, in contrast to the use position, the seat element 2 would not be usable in the transition position. Furthermore, it is provided that the vehicle seat 1 has a second locking element 9 which keeps and fixes and secures the seat element 2 in the storage position. The second locking element 9 is preferably arranged on the front base part 16 and/or interacts with the third link 13.

Figure 2:
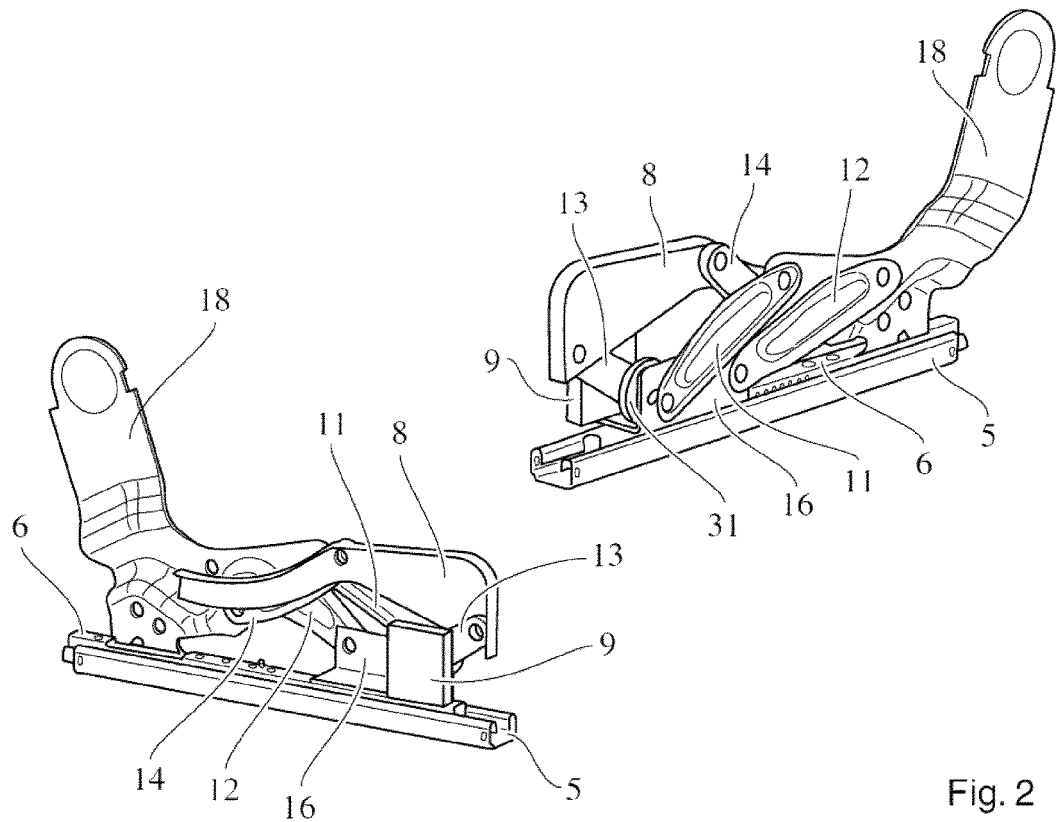
FIG. 2 shows the front and rear side of part of the basic body of the vehicle seat according to the first exemplary embodiment of the present invention.

FIG. 2 shows the front and rear side of part of the basic body from FIG. 1. The illustrated part of the basic body comprises the upper and lower rail 5 and 6 of the rail system and also the rear and the front base part 16 and 18, the second locking element 9, the spring element 31, the first and the second link 11 and 12 of the four-bar linkage, and the third and the fourth link 13 and 14 of the further four-bar linkage.

Figure 3:
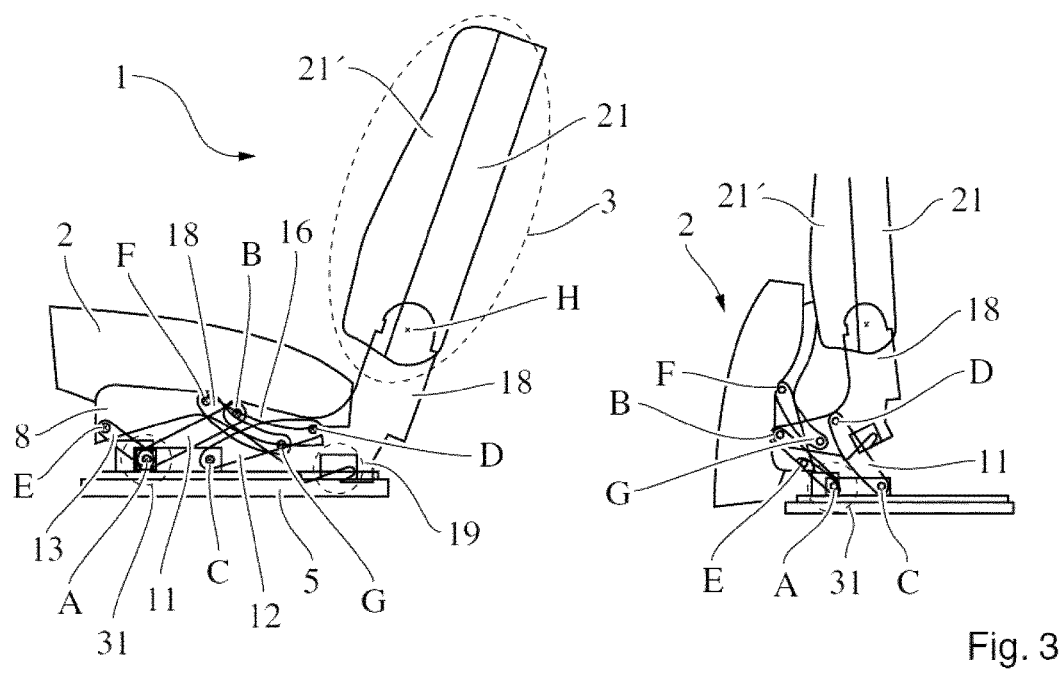
FIG. 3 shows the vehicle seat according to the first exemplary embodiment in a basic position and in an optional stowage configuration.

FIG. 3 illustrates the vehicle seat 1 according to the first exemplary embodiment in a use position and in an optional storing position. The vehicle seat 1 is illustrated in the use position on the left side. The vehicle seat 1 here comprises a backrest element 3 with a backrest element frame 21 and a backrest cushion or backrest pad 21'. In the use position illustrated, essentially the first locking element ensures that the seat element 2 is not vertically adjustable and therefore is not usable by a potential passenger (sitting on the seat element 2). In the optional storing position illustrated on the right side, the seat element 2 is folded up by the articulation system and the further articulation system, and backrest element 3 and seat element 2 are oriented parallel to each other and substantially perpendicularly to the profile of the body floor. In this position, for example, a storage space arranged behind the vehicle seat 1 can be enlarged in an advantageous manner. Furthermore, in order to fold up the seat element 2, the rear base part 18 has to be released from the tipper rail 6 of the rail system. For this purpose, for example, the closure means 19 which otherwise prevents release of the rear base part 18 is unlocked.

Figure 4:
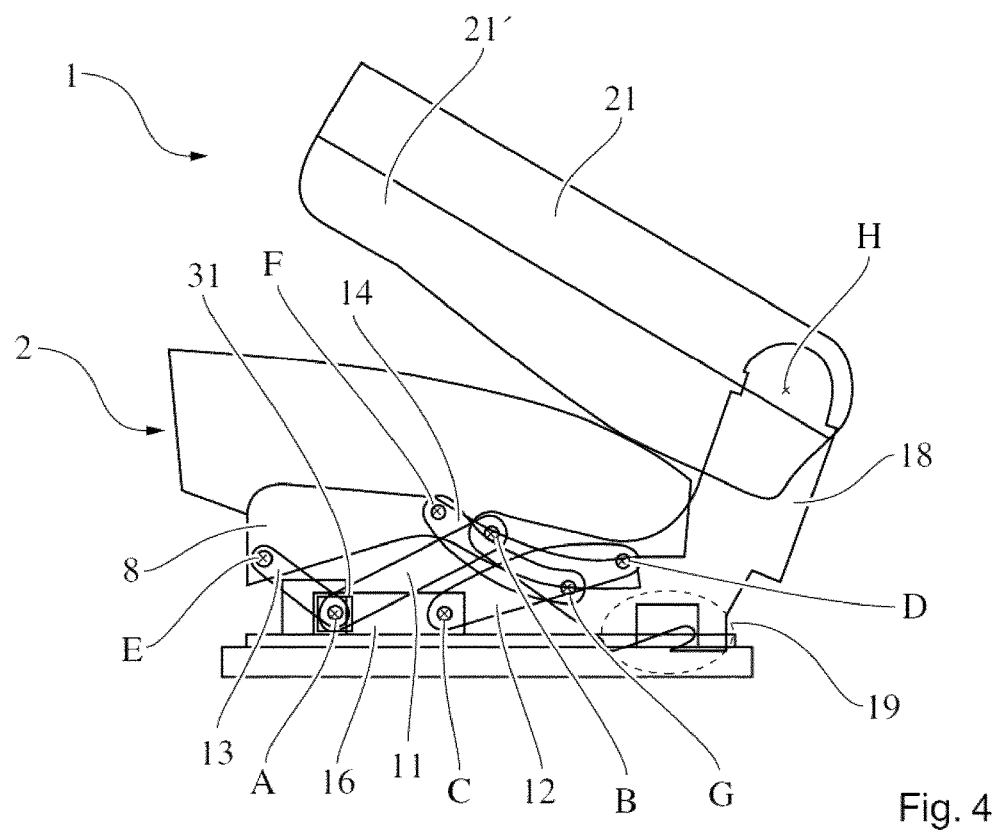
FIG. 4 shows the vehicle seat according to the first exemplary embodiment in a transition position.

FIG. 4 illustrates the vehicle seat 1 from FIGS. 1 to 3, wherein the seat element 2 is arranged in the transition position. In particular, it is provided that, by pivoting the backrest element 3 about the primary axis H, the seat element 2 is transferable from the use position into the transition position. It is conceivable here for the transition position and the use position to be identical or to correspond in their position or positioning and/or orientation and for the transition position to be taken up by the seat element only by means of the unlocking of the first locking element. Furthermore, it is conceivable for the backrest element 3 to be transferred at the same time into a stowage position by pivoting. In the stowage position, a main plane of extent of the seat element and a main plane of extent of the backrest element 3 form an angle which is smaller than 60°, preferably smaller than 30°, particularly preferably is smaller than 10°. In particular, the seat element 2 and the backrest element 3 are arranged at least partially in a form-fitting manner in a direction running parallel to the storage direction.

Figure 5:
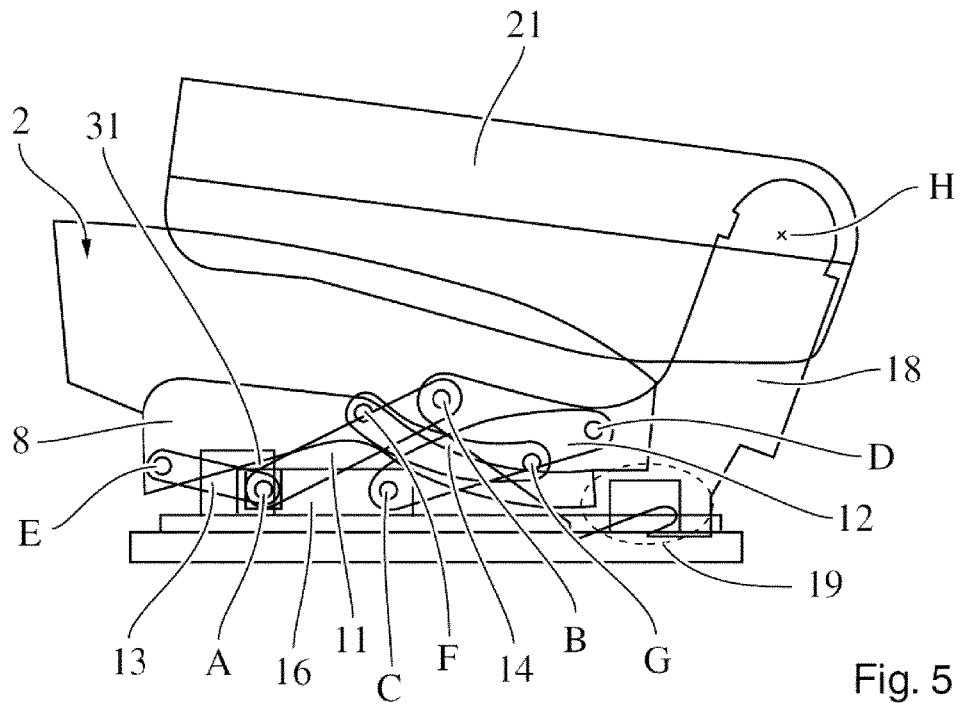
FIG. 5 shows the vehicle seat according to the first exemplary embodiment with a seat element in a storage position and a backrest element in a stowage position.

FIG. 5 illustrates the vehicle seat 1 from FIG. 4, wherein the seat element 2 is arranged in the storage position and the backrest element 3 is arranged in the stowage position. It is provided that the form-fitting arrangement of backrest element 3 and seat element 2 is usable during the transfer of the seat element 2 from the transition position into the storage position. In particular, it is provided that the backrest element 3 is usable as a flow of force means, which acts in the storage direction, during the transfer of the seat element 2 from the transition position into the storage position. In other words: it is provided that, in the stowage position, the backrest element 3 is displaceable downward manually via user and, by the form-fitting action of the backrest element 3 with the seat element 2, the seat element 2 is transferable into the storage position by an action of force on the backrest element 2. In particular, the seat element 2 is fixed or secured, preferably automatically, by the second locking element 19 after the transfer into the storage position. For the further securing in the transition position of the seat element 2, it is furthermore conceivable for a third locking element to be provided, wherein the third locking element is configured in such a manner that the seat element 2 is transferable into the storage position only upon actuation of the third locking element, as a result of which a two-handed operation can be realized.

Figure 6:
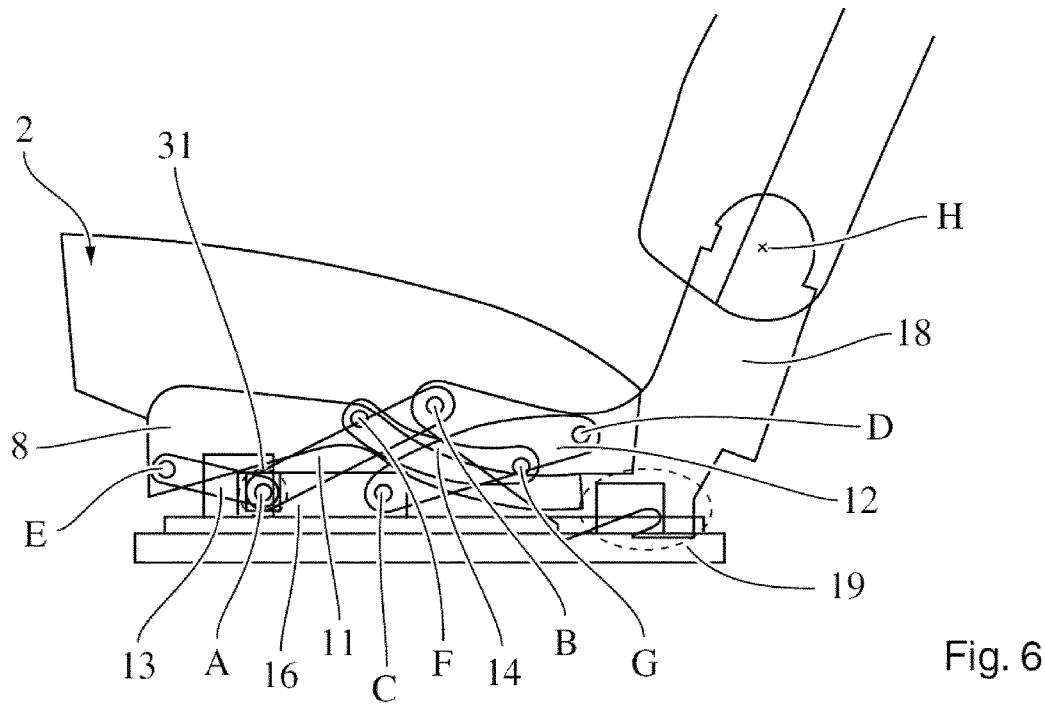
FIG. 6 shows the vehicle seat according to the first exemplary embodiment of the seat element in the storage position and the backrest element in a backrest use position.

FIG. 6 illustrates the vehicle seat 1 from FIGS. 1 to 3, wherein only the seat element 2 is arranged in the storage position. In this configuration of the vehicle seat 1, the backrest element 3 is in a non-stowage position. For such a configuration, it is provided that the first locking element is actuated by an actuating means, for example an additional lever, for the transfer of the seat element 2 from a use position into a transfer position. It is provided that, following the actuation of the actuating means, the seat element 2 is manually transferable directly from the transition position into the storage position. In particular, the seat element 2 is pressed into the storage position. Furthermore, it is provided that the backrest element 3 is pivotable into the stowage position as soon as the seat element 2 has taken up the storage position.

LIST OF REFERENCE SIGNS

1 Vehicle seat
2 Seat element
3 Backrest element
5 Lower rail
6 Upper rail
8 Seat element carrier
9 Second locking element
11 First link
12 Second link
13 Third link
14 Fourth link
16 Front base part
18 Rear base part
19 Closure means
21 Backrest element frame
21' Backrest element pad
31 Spring element
A First axis
B Second axle
C Third axis
D Fourth axis
E Fifth axis
F Sixth axis
G Seventh axis
H Primary axis
I storage direction

The invention claimed is:

1. A vehicle seat having a seat element which is vertically adjustable from a use position into a storage position, wherein the vehicle seat has:
   a first locking element for securing the seat element in the use position,
   a positioning means for positioning the seat element in a transition position,
   an articulation system consisting of a first link and a second link for folding up the seat element, and
   a further articulation system consisting of a third link and a fourth link for transferring the seat element from the transition position into a storage position,
      wherein the seat element is transferable manually directly or indirectly from the transition position into the storage position,
      wherein the positioning means comprises a spring element,
      wherein a restoring force of the spring element keeps the seat element in the transition position,
      wherein the articulation system is a four-bar linkage,
      wherein the further articulation system is a four-bar linkage,
      wherein the spring element is integrated in the articulation system, and
      wherein the spring element is operatively connected to the third link.

2. The vehicle seat as claimed in claim 1, wherein the vehicle seat has a backrest element, wherein the backrest element is pivotable about a primary axis relative to the seat element.

3. The vehicle seat as claimed in claim 2, wherein the first locking element is unlockable by pivoting the backrest element and/or actuating an actuating means.

4. The vehicle seat as claimed in claim 2, wherein the backrest element is transferable into a stowage position by pivoting, wherein, in the stowage position, the backrest element is arranged in a substantially form-fitting manner along a vertical adjustment direction running substantially perpendicularly to a main plane of extent of the seat element.

5. The vehicle seat as claimed in claim 1, wherein the vehicle seat has a second locking element for securing the seat element in the storage position.

6. The vehicle seat as claimed in claim 5, wherein the vehicle seat has a third locking element for securing the transition position.

7. A method for stowing a vehicle seat, wherein:
   in a first method step, a first locking element for securing a seat element of the vehicle seat in a use position is released,
   in a second method step, the seat element is kept in a transition position, and
   in a third method step, the seat element is transferred from the transition position into the storage position,
   wherein the vehicle seat includes:
      an articulation system consisting of a first link and a second link for folding up the seat element, the articulation system being a four-bar linkage,
      a further articulation system consisting of a third link and a fourth link for transferring the seat element from the transition position into a storage position, the further articulation system being a four-bar linkage,
   wherein a spring element is integrated into the articulation system, and
   wherein the spring element is operatively connected to the third link.

8. The method as claimed in claim 7, wherein a backrest element which is pivotable about a primary axis relative to the seat element:
   is transferred in the first method step and is used as a flow of force means for transferring the seat element into the storage position, or is transferred after the third method step into a stowage position.

\* \* \* \* \*